United States Patent
Stengel, Jr.

(10) Patent No.: US 6,256,480 B1
(45) Date of Patent: Jul. 3, 2001

(54) BROADCAST COUPLER

(75) Inventor: Francis A. Stengel, Jr., Lancaster, NY (US)

(73) Assignee: Sti-Co Industries, Inc., Orchard Park, NY (US)

(*) Notice: Subject to any disclaimer, the term of this patent is extended or adjusted under 35 U.S.C. 154(b) by 0 days.

(21) Appl. No.: 09/236,056

(22) Filed: Jan. 22, 1999

Related U.S. Application Data

(60) Provisional application No. 60/072,254, filed on Jan. 23, 1998.

(51) Int. Cl.[7] ........................... H04B 1/44
(52) U.S. Cl. ........................... 455/78; 455/280
(58) Field of Search .................... 455/280, 281, 455/282, 283, 284, 285, 286, 288, 289, 78, 290, 83, 307, 82; 343/711; 333/67, 32

(56) References Cited

U.S. PATENT DOCUMENTS

| | | | |
|---|---|---|---|
| 3,725,942 | * | 4/1973 | Ukmar ................................ 343/715 |
| 4,037,177 | * | 7/1977 | Tyrey ................................. 333/32 |
| 4,085,405 | * | 4/1978 | Barlow ............................... 343/858 |
| 4,106,025 | * | 8/1978 | Katz .................................. 343/715 |
| 4,141,016 | * | 2/1979 | Nelson ............................... 343/858 |
| 4,352,111 | * | 9/1982 | Carleson et al. .................... 343/860 |
| 5,258,728 | * | 11/1993 | Taniyoshi et al. ................... 333/132 |
| 5,502,715 | * | 3/1996 | Penny ................................. 370/26 |
| 5,771,026 | * | 6/1998 | Stengel, Jr. ......................... 343/850 |

\* cited by examiner

*Primary Examiner*—Nguyen T. Vo
*Assistant Examiner*—Naghmeh Mehrpour
(74) *Attorney, Agent, or Firm*—Hodgson Russ LLP

(57) ABSTRACT

A broadcast coupler which couples both a broadcast radio receiver and communications equipment in a vehicle to the existing OEM vehicle antenna wherein no physical modifications are made to either the antenna mast or the antenna base or the antenna feed line. The broadcast coupler has a built-in tuner capability which permits the existing OEM supplied antenna to function as a low standing wave ratio (SAR) communications antenna. The broadcast coupler tunes the existing OEM antenna and provides the necessary isolation to permit the communications equipment, i.e., transmitter, receiver or transceiver, to function without detection by the operator of the vehicle. Since the existing OEM antenna is tuned by the broadcast coupler, the vehicle does not have to be modified and a new antenna does not have to be purchased.

13 Claims, 3 Drawing Sheets

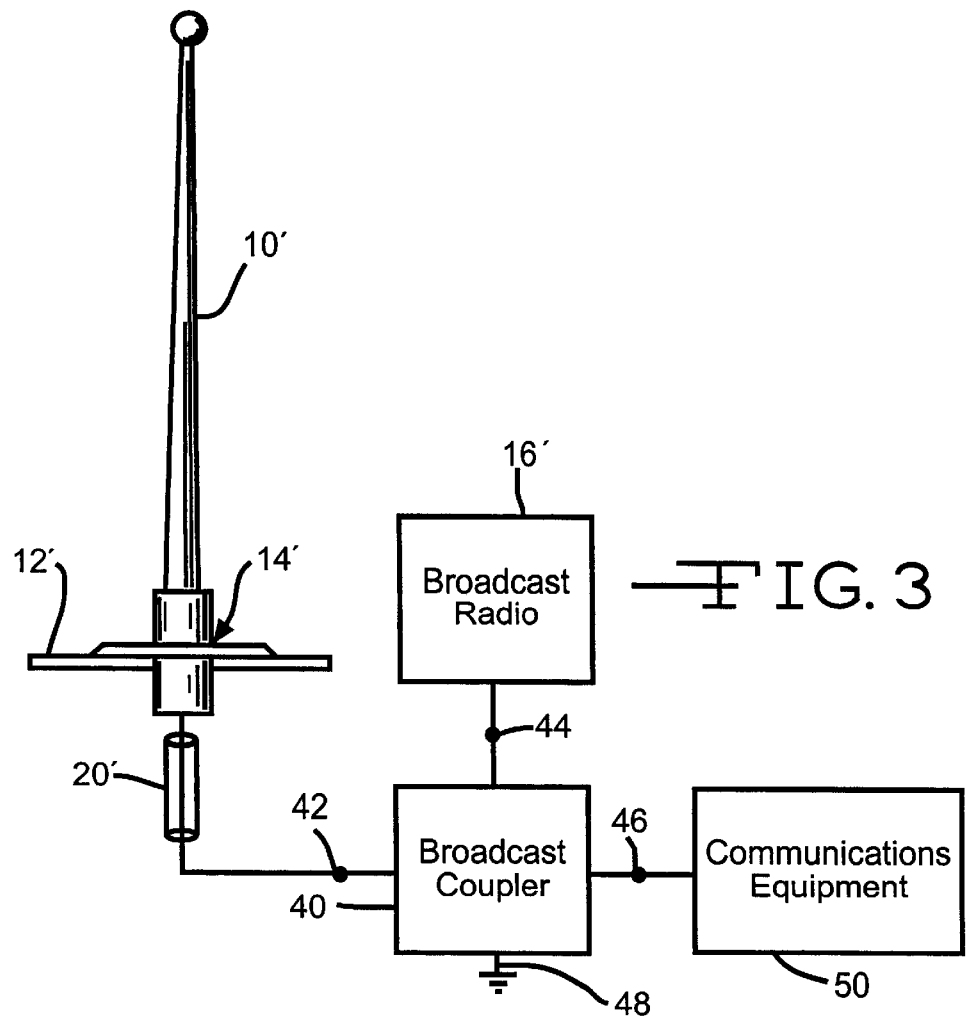
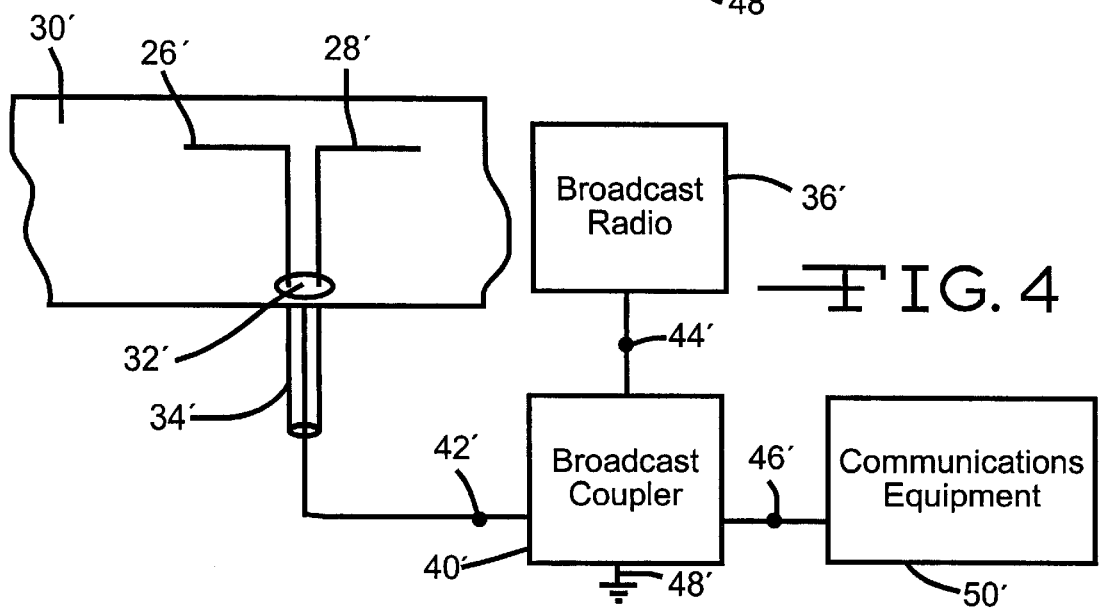

BROADCAST COUPLER

CROSS REFERENCE TO A RELATED APPLICATION

Applicant hereby claims priority based on Provisional Application No. 60/072,254 filed Jan. 23, 1998 and entitled "Broadcast Coupler" which is incorporated herein by reference.

BACKGROUND OF THE INVENTION

This invention relates to the art of broadcast couplers for radios and communications equipment located in vehicles, and more particularly to a new and improved broadcast coupler for coupling an unmodified vehicle antenna to communications equipment and a broadcast radio receiver in the vehicle.

An important area of use of the present invention is antenna systems for vehicles for operation with both standard broadcast radio receivers and additional communications equipment such as receivers, transmitters or transceivers for surveillance, law enforcement and similar functions. There are broadcast couplers which are commercially available which will couple such additional communications equipment into an original equipment manufacture (OEM) antenna without tuning. Lack of tuning capability can be a disadvantage, however, because the vehicle manufacturer does not control the antenna characteristics closely in the broadcast frequency range, much less any other frequency ranges of interest. Other commercially available devices will tune a modified replacement antenna for coupling to such communications equipment. This, however, has the disadvantage of added expense in replacing the OEM supplied antenna.

SUMMARY OF THE INVENTION

It would, therefore, be highly desirable to provide a broadcast coupler which has tuning capability and which is used with the existing OEM vehicle antenna.

The present invention provides a broadcast coupler which couples both a broadcast radio receiver and communications equipment in a vehicle to the existing OEM vehicle antenna wherein no physical modifications are made to either the antenna mast or the antenna base or the antenna feed line. The broadcast coupler has a built-in tuner capability which permits the existing OEM supplied antenna to function as a low standing wave ratio (SWR) communications antenna. The broadcast coupler tunes the existing OEM antenna and provides the necessary isolation to permit the communications equipment, i.e., transmitter, receiver or transceiver, to function without detection by the operator of the vehicle. Since the existing OEM antenna is tuned by the broadcast coupler, the vehicle does not have to be modified and a new antenna does not have to be purchased.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 3 is a schematic diagram showing the broadcast coupler of the present invention employed in the vehicle antenna arrangement of FIG. 1;

FIG. 4 is a schematic diagram showing the broadcast coupler of the present invention employed in the vehicle antenna arrangement of FIG. 2;

DETAILED DESCRIPTION OF THE ILLUSTRATED EMBODIMENT

Figure 1:
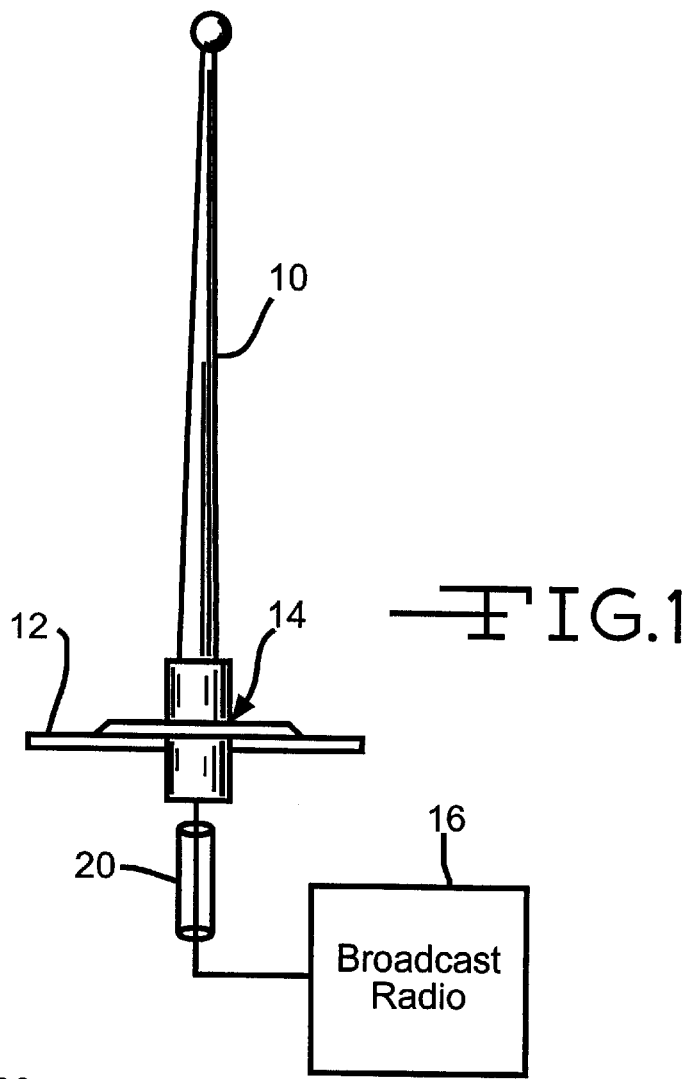
FIG. 1 is a schematic diagram of one form of vehicle antenna arrangement to which the broadcast coupler of the present invention is applicable.

Referring to FIG. 1, there is shown a standard vehicle antenna 10 of the mast or whip type which is mounted on an exterior surface 12 of the vehicle by means of a base 14. The vehicle contains a standard broadcast or entertainment radio receiver 16 which is connected to the antenna through an antenna feed line 20. Antenna 10, base 14 and feed line 20 are OEM equipment, i.e., original equipment provided by the vehicle manufacturer. As will be shown and described in detail presently, the broadcast coupler of the present invention is utilized in a vehicle antenna arrangement of the type shown in FIG. 1.

Figure 2:
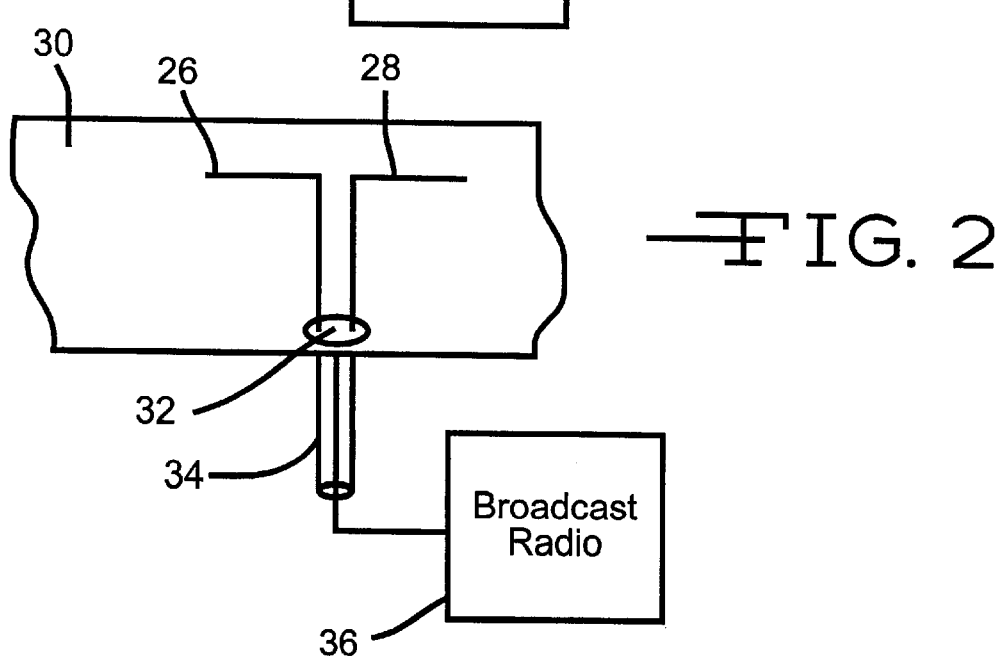
FIG. 2 is a schematic diagram of another form of vehicle antenna arrangement to which the broadcast coupler of the present invention is applicable.

FIG. 2 shows one form of windshield antenna arrangement in which the broadcast coupler of the present invention can be utilized. A pair of antenna elements 26,28 are mounted on a vehicle windshield 30 in a known manner. For purposes of definition herein, elements 26,28 collectively will be considered to be an antenna mast. Elements 26,28 are joined or connected at a base designated 32 to an antenna feed line 34. Feed line 34, in turn, is connected to a standard broadcast or entertainment radio receiver 36 which is the same as radio receiver 16 in the arrangement of FIG. 1. Antenna mast 26,28, base 32 and feed line 34 are OEM equipment, i.e. original equipment provided by the vehicle manufacturer. While the windshield antenna arrangement shown in FIG. 2 is of the dipole type, the broadcast coupler of the present invention can be utilized in other forms of vehicle windshield antennas.

Referring now to FIG. 3, the manner in which the broadcast coupler of the present invention is utilized to couple communication equipment to the antenna arrangement of FIG. 1 is shown. The term communications equipment is intended to include receivers, transmitters or transreceivers which operate in frequency ranges different from the radio broadcast frequency range and which typically are used for surveillance, law enforcement and similar functions. In FIG. 3 components similar to those in FIG. 1 are identified by the same reference numeral with a prime designation. Broadcast radio receiver 16' is disconnected from antenna feed line 20'. The broadcast coupler of the present invention, generally designated 40, has three signal terminals 42, 44 and 46. Since all the lines in the arrangement of FIG. 3 are coaxial and contain their own ground, a separate ground ordinarily is not necessary. If desired, a ground terminal 48 can be provided to prevent ingress of vehicle-generated electrical noise. Terminals 42 and 44 are connected to antenna feed line 20' and to broadcast radio receiver 16', respectively. Terminal 46 is connected to communications equipment 50 which is being installed in the vehicle. In some situations, equipment 50 will be located in the vehicle so as to be accessible to persons inside the vehicle but not readily seen from the outside, for example under the vehicle dashboard. In other situations, where the existence of equipment 50 is to be concealed from the operator of the vehicle and anyone else in the vehicle, the equipment 50 is mounted at a concealed location such as under the vehicle chassis or frame. Ground terminal 48 can be connected to a convenient ground point, for example on the vehicle frame. The broadcast coupler 40 of the present invention tunes the existing OEM antenna 10', 14', 20' and provides the necessary isolation to permit the communications equipment 50 to function without interfering with reception by broadcast radio 16' and without detection by the vehicle operator. This is done with no physical modification to antenna mast 10', antenna base 14'or antenna feed line 20'.

FIG. 4 illustrates the manner in which the broadcast coupler of the present invention is utilized to couple communications equipment to the antenna arrangement of FIG. 2. As previously mentioned, the term communication equipment is intended to include receivers, transmitters or transreceivers which operate in frequency ranges different from the radio broadcast frequency range and which typically are used for surveillance, law enforcement and similar functions. In FIG. 4, components similar to those in FIGS. 2 and 3 are identified by the same reference numeral with a prime designation. Broadcast radio receiver 36' is disconnected from antenna feed line 34'. The broadcast coupler of the present invention, generally designated 40', as described in communication with FIG. 3 has three signal terminals 42', 44' and 46'. Since all the lines in the arrangement of FIG. 4 are coaxial and contain their own ground, a separate ground ordinarily is not necessary. If desired, a ground terminal 48' can be provided to prevent ingress of vehicle-generated electrical noise. Terminals 42' and 44' are connected to antenna feed line 34' and to broadcast radio receiver 36', respectively. Terminal 46' is connected to communications equipment 50' which is being installed in the vehicle. As previously described, in some situations, equipment 50' will be located in the vehicle so as to be accessible to persons inside the vehicle but not readily seen from the outside, for example under the vehicle dashboard. In other situations, where the existence of equipment 50' is to be concealed from the operator of the vehicle and anyone else in the vehicle, the equipment 50' is mounted at a concealed location such as under the vehicle chassis or frame. Ground terminal 48' can be connected to a convenient ground point, for example, on the vehicle frame. The broadcast coupler 40' of the present invention tunes the existing OEM antenna 26', 28', 32', 34' and provides the necessary isolation to permit the communications equipment 50' to function without interfering with reception by broadcast radio 36' and without detection by the vehicle operator. This is done with no physical modification to antenna mast 26', 28', antenna base 32' or antenna feed line 34'.

The broadcast coupler 40 of the present invention, utilized in vehicle antenna arrangements as described herein above, is distinguished from coupling arrangements heretofore available in two important respects. One is that the antenna to be tuned is the original antenna supplied as OEM equipment on the vehicle. Another is that the coupler 40 has a built in tuner capability which will permit the existing OEM supplied antenna to function as a low SWR communications antenna. The broadcast coupler 40 of the present invention tunes the existing OEM antenna and provides the necessary isolation to permit the transmitters or receivers to function without detection by the vehicle operator.

There are several reasons that using the existing OEM antenna is desirable. One that the vehicle does not have to be modified. Another is that a new antenna does not need to be purchased. As a result, there are the following benefits. Cost is reduced by using the built-in OEM antenna as supplied. Cost also is reduced because there is no need for modification of the OEM supplied antenna installation.

If the purpose of the antenna is covert, even the owner of the vehicle need not be aware of the addition of the communications equipment. This is particularly useful if the installation is to provide tracking of a stolen vehicle. The fact that neither the vehicle nor the antenna mast, base and feed line are modified is particularly advantageous in such covert situations because avoidance of such modifications enables the communications equipment and coupler to be installed in a vehicle very quickly. Furthermore, even if the owner may be aware of the change he cannot tell where the hidden equipment is. When the OEM antenna is mounted outside the car on the fender, better communications is obtained than if it were mounted under the car, or inside the car. This feature obviously increases the efficiency and value of the communications equipment.

The use of the original OEM antenna places several requirements on the broadcast coupler 40 of the present invention. It must be designed to provide superior isolation. For overt operation, it must permit high quality reception by the broadcast radio without interference from the communications. For covert operation, it must eliminate the ability of the broadcast radio to alert intruders to the on-board presence of a tracking device. Another requirement is that the coupler 40 must have a very wide range of matching capability to provide tuning the OEM antenna since the automotive manufacturer does not control the antenna characteristics closely in the broadcast range, much less for communications frequencies they have no commercial interest in.

Figure 5:
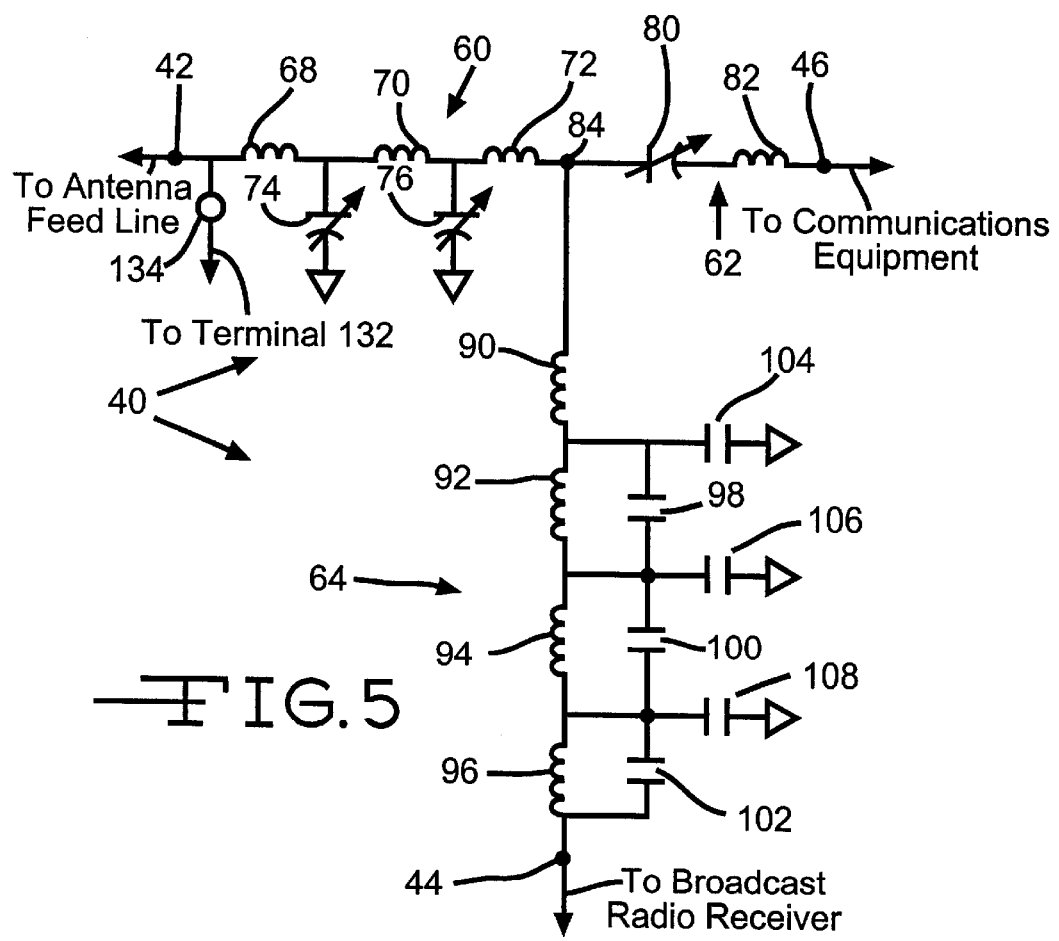
FIG. 5 is a schematic circuit diagram of the broadcast coupler of the present invention.

FIG. 5 is a schematic circuit diagram of the broadcast coupler 40 of the present invention. As previously described, coupler 40 includes terminals 42, 44 and 46 for connection to the antenna feed line, broadcast radio receiver and communications equipment, respectively. Coupler 40 includes the following three main components. A low pass filter 60 for the broadcast radio receiver is designed for a very low capacity shunt to ground. This reduces broadcast radio signal degradation. Low pass filter 60 lowers the standing wave ratio (SWR) of the OEM antenna (antenna mast, base and feed line) to permit the antenna to function as an efficient radiator of RF energy in a frequency range other than the AM or FM frequencies of the broadcast radio. A series resonant trap 62 isolates the communications equipment from loading the broadcast radio. Trap 62 may be viewed as a band pass device. A band pass filter 64 provides very high isolation to inhibit interfering with the broadcast radio reception.

The following three goals are accomplished by the broadcast coupler 40 of the present invention shown in FIG. 5. A first goal is to not modify the signal path from the OEM antenna (antenna mast, base and feed line) connected to terminal 42 to the broadcast radio connected to terminal 44 any more than necessary. A second is to tune the OEM antenna (antenna mast, base and feed line) connected to terminal 42 to form a more perfect match for the transmitter, i.e. communication equipment, connected to terminal 46 at the transmitter operating frequency. A third goal is to create maximum insertion loss between the transmitter connected to terminal 46 and the broadcast radio connected to terminal 44 to minimize the possibility of detection of the presence of the transmitter.

Low pass filter 60 comprises an LC circuit including the series combination of inductors 68, 70 and 72 and variable capacitors 74 and 76 in parallel therewith. In particular, variable capacitor 74 is connected between the junction of inductor 68 and inductor 70 and ground. Variable capacitor 76 is connected between the junction of inductors 70 and 72 and ground. Series resonant trap 72 comprises the series combination of variable capacitor 80 and inductor 82 connected between a junction 84 and terminal 46.

Band pass filter 64 is connected between the junction 84 of inductor 72 and variable capacitor 80 and terminal 44. Band pass filter 64 comprises an LC network including the series combination of inductors 90, 92,94 and 96. The network also includes the series combination of capacitors 98, 100 and 102 connected across or in parallel with the combination of inductors 92, 94 and 96. The network further includes capacitors 104, 106 and 108 connected between the combination of the inductors and ground. In particular, capacitor 104 is connected between the junction of inductors 90 and 92 and ground, capacitor 106 is connected between the junction of inductors 92 and 94 and ground, and capacitor 108 is connected between the junction of inductors 94 and 96 and ground. As shown in FIG. 5, capacitor 104 also is connected to one terminal of capacitor 98, capacitor 106 also is connected to the junction of capacitors 98 and 100 and capacitor 108 is connected to the junction of capacitors 100 and 102.

Upon installation of broadcast coupler 40 in a vehicle, i.e. when coupler 40 is used to install communications equipment in the vehicle as illustrated, for example, in FIGS. 3 and 4, low pass filter 60 is tuned by adjusting variable capacitors 74 and 76 and the series-tuned circuit or trap 62 is adjusted via variable capacitor 80 to obtain minimum standing wave ratio (SWR) and maximum transmitted signal. This tuning capability of the broadcast coupler 40 of the present invention is one of the primary advantages over couplers heretofore available.

Capacitors 98, 100 and 102 modify the low pass characteristics of filter 64 to cause it to have a band reject characteristic at the frequencies being employed by the communications equipment, i.e. transmitter. This produces discrete nulls located outside the pass band of filter 64 to further reject transmitter interference with the broadcast radio. Inductors 92, 94 and 96 are parallel resonant with capacitors 98, 100 and 102 to further reject the transmitter frequency being used.

By way of example, in an illustrative circuit for operation of communications equipment connected to terminal 46 at a frequency of 150 MHZ in the VHF range, inductor 68 has 9 turns representing approximately 8.5 nanohenries, inductors 70 and 72 both have 7 turns representing approximately 77 nanohenries, capacitor 74 has a magnitude of 16.3 picofarads and capacitor 76 a magnitude of 3.7 picofarads. Capacitor 80 has a magnitude of 7.2 picofarads and inductor 82 has 9 turns representing approximately 88 nanohenries. Each of the inductors 90, 92, 94 and 96 has 7 turns representing approximately 77 nanohenries. Capacitors 98, 100 and 102 have magnitudes of 8.9 picofarads, 14.2 picofarads and 8.9 picofarads, respectively. Capacitors 104, 106 and 108 have magnitudes of 27 picofarads, 22 picofarads and 24 picofarads, respectively. Bank pass filter 64 provides about 50 db of isolation. The foregoing illustrative circuit of FIG. 5 with the indicated component values in this example is turnable over a 20:1 SWR in the 150–174 MHZ range and corrected to a SWR of approximately 2:1.

The capabilities of the broadcast coupler of the present invention can be extended to provide coupling at multiple communications frequencies. This capability is particularly useful should it become necessary to communicate information gathered from one service to a recording station on another band. As an example of this consider remote tracking of a vehicle using the GPS (global positioning satellites system) and transmitting this information on command from a land based network using the Cellular phone network. Another example of this would be to return the information when interrogated by a ground station via another LEO (low earth orbit) satellite systems presently in place and functional.

Figure 6:
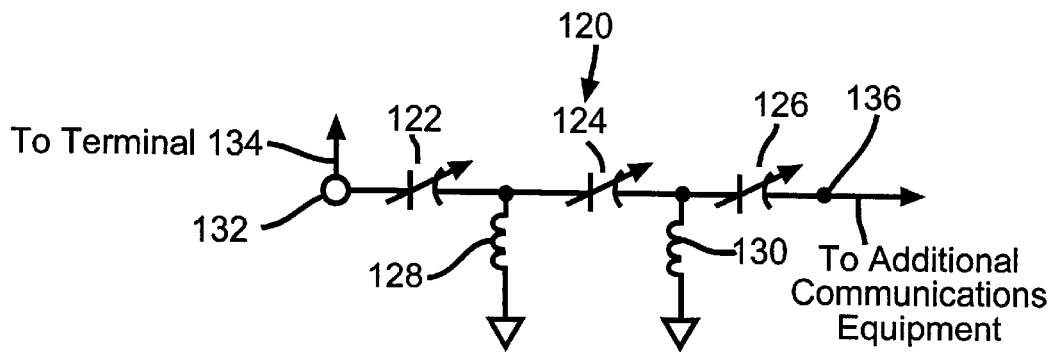
FIG. 6 is a schematic circuit diagram of another embodiment of the broadcast coupler.

FIG. 6 shows a circuit 120 for extending the capability of a coupler 40 of FIG. 5 for operation with a second item of communications equipment, i.e. a second transmitter, operating at a different communications frequency. The circuit of FIG. 6 is a high pass filer comprising the series combination of variable capacitors 122, 124 and 126 and inductors 128, and 130 in parallel therewith. A first terminal 132 of the circuit 120 is connected to a terminal 134 provided in coupler 40 adjacent terminal 42. A second terminal 136 of circuit 120 is connected to the second piece of communications equipment, i.e. transmitter, operating at a frequency different from that of the equipment connected to terminal 46 of coupler 40.

In the circuit of FIG. 6, inductor 128 is connected between the junction of capacitors 122 and 124 to ground, and inductor 130 is connected between the junction of capacitors 124 and 126 and ground. Upon installation, variable capacitors 122, 124 and 126 are adjusted to tune the OEM antenna (antenna mast, base and fee line) connected to terminal 42 to form a more perfect match for the communications equipment, i.e. transmitter, connected to terminal 136. Depending upon the overall operating characteristics desired, the values of capacitors 98, 100 and 102 in filter can be changed to adjust to the transmitted frequency of the equipment connected to terminal 136.

By way of example, in an illustrative circuit of FIG. 6 connected to the circuit of FIG. 5 in the previously described example for which component values were given, with the equipment connected to terminal 136 operating at a frequency of 400 MHZ, capacitors 122, 124 and 126 have magnitude of 8.9 picofarads, 13 picofarads and 4.2 picofarads, respectively, and each inductor 128 and 130 has 4.5 turns representing approximately 35 nanohenries.

It is therefore apparent that the present invention accomplishes its intended objects. While embodiments of the present invention have been described in detail that has been done for purpose of illustration, not limitation.

What is claimed is:

1. A broadcast coupler for coupling both a broadcast radio receiver and communications equipment in a vehicle to an existing OEM vehicle antenna comprising antenna mast, base and feed line, said broadcast coupler being connected to said antenna, broadcast radio receiver and communications equipment with no physical modification to said antenna mast, base and feed line, said broadcast coupler allowing operation of said communications equipment without interference with reception of said broadcast radio, said broadcast coupler comprising a low pass filter connected between said antenna and a junction, a resonant trap connected between said communications equipment and said junction, and a bandpass filter connected between said broadcast radio receiver and said junction.

2. A broad cast coupler according to claim 1 further including a circuit for connecting additional communications equipment operating at a different frequency to said broadcast coupler allowing operation of said additional communications equipment without interference with reception of said broadcast radio.

3. A broadcast coupler according to claim 1, wherein said low pass filter and said resonant trap are tunable.

4. A broadcast coupler for coupling both a broadcast radio receiver and communications equipment in a vehicle to an existing OEM vehicle antenna comprising antenna mast, base and feed line, said broadcast coupler being connected to said antenna, broadcast radio receiver and communications equipment with no physical modification to said antenna mast, base and feed line, said broadcast coupler providing signal paths between said antenna and said broadcast radio receiver and between said antenna and said communications equipment, said broadcast coupler minimizing any modification in the signal, said broadcast coupler including a low pass filter and a bandpass filter in the signal path between said antenna and said broadcast radio receiver and said broadcast coupler including a resonant trap in the signal path between said antenna and said communications equipment.

5. A broadcast coupler according to claim 4 further including a circuit for connecting additional communications equipment operating at a different frequency to said broadcast coupler allowing operation of said additional communications equipment without interference with reception of said broadcast radio.

6. A broadcast coupler according to claim 4, wherein said low pass filter and said resonant trap are tunable.

7. In combination:
   a) a physically unmodified vehicle OEM antenna comprising antenna mast, base and feed line carried by a vehicle;
   b) a broadcast radio receiver in the vehicle;
   c) communications equipment in the vehicle; and
   d) a tunable broadcast coupler connected to said antenna, broadcast radio receiver and communications equipment with no physical modification to said antenna mast, base and feed line, said tunable broadcast coupler allowing operation of said communications equipment without interference with reception of said broadcast radio, said broadcast coupler comprising a low pass filter and a bandpass filter connected between said antenna and said broadcast radio receiver and a resonant trap connected between said communications equipment and a junctions of said low pass filter and said bandpass filter.

8. The combination according to claim 7, further including a circuit for connecting additional communications equipment operating at a different frequency to said broadcast coupler allowing operation of said additional communications equipment without interference with reception of said broadcast radio.

9. The combination according to claim 7, wherein said low pass filter and said resonant trap are tunable.

10. A broadcast coupler for coupling both a broadcast radio receiver and communications equipment in a vehicle to an existing OEM vehicle antenna comprising antenna mast, base and feed line, said broadcast coupler being connected to said antenna, broadcast radio receiver and communications equipment with no physical modification to said antenna mast, base and feed line, said broadcast coupler providing signal paths between said antenna and said broadcast radio receiver and between said antenna and said communications equipment, said broadcast coupler minimizing any modification in the signal, said broadcast coupler comprising:
   a) a tunable low pass filter in the signal path between said antenna and said broadcast radio receiver to provide a low capacity shunt to ground to reduce broadcast radio signal degradation and to lower the standing wave ratio of the OEM antenna to permit the antenna to function as an efficient radiator of RF energy in a frequency range other than that of the broadcast radio;
   b) a tunable series resonant trap in the signal path including said communications equipment for isolating said communications equipment from loading said broadcast radio receiver; and
   c) a band pass filter in the signal path including said broadcast radio for providing sufficient isolation to inhibit interference with broadcast radio receiver reception.

11. A broadcast coupler according to claim 10 further including a tunable high pass filter in the signal path including said antenna for connection to additional communications equipment operating at a different frequency to allow operation of said additional communications equipment without interference with reception of said broadcast radio.

12. A broadcast coupler for coupling both a broadcast radio receiver and communications equipment in a vehicle to an existing OEM vehicle antenna comprising antenna mast, base and feed line, said broadcast coupler being connected to said antenna, broadcast radio receiver and communications equipment with no physical modification to said antenna mast, base and feed line, said broadcast coupler allowing operation of said communications equipment without interference with reception of said broadcast radio, said broadcast coupler comprising:
   a) a tunable low pass filter for said broadcast radio receiver to provide a low capacity shunt to ground to reduce broadcast radio signal degradation and to lower the standing wave ratio of the OEM antenna to permit the antenna to function as an efficient radiator of RF energy in a frequency range other than that of said broadcast radio;
   b) a tunable series resonant trap for isolating said communications equipment from loading said broadcast radio receiver; and
   c) a band pass filter for providing sufficient isolation to inhibit interference with broadcast radio receiver reception.

13. A broadcast coupler according to claim 12 further including a tunable high pass filter for connection to additional communications equipment operating at a different frequency to allow operations of said additional communications equipment without interference with reception of said broadcast radio.

* * * * *